(12) United States Patent
Sinyard et al.

(10) Patent No.: US 7,398,986 B2
(45) Date of Patent: Jul. 15, 2008

(54) BICYCLE FRONT FORK ASSEMBLY

(75) Inventors: Mike Sinyard, Morgan Hill, CA (US); Bradley L. Waldron, San Jose, CA (US); Christopher P. D'Aluisio, Watsonville, CA (US)

(73) Assignee: Specialized Bicycle Components, Inc., Morgan Hill, CA (US)

( * ) Notice: Subject to any disclaimer, the term of this patent is extended or adjusted under 35 U.S.C. 154(b) by 0 days.

(21) Appl. No.: 11/674,613

(22) Filed: Feb. 13, 2007

(65) Prior Publication Data

US 2007/0210553 A1    Sep. 13, 2007

Related U.S. Application Data

(63) Continuation of application No. 11/417,996, filed on May 3, 2006, now Pat. No. 7,175,191, which is a continuation of application No. 10/692,226, filed on Oct. 23, 2003, now Pat. No. 7,144,028, which is a continuation of application No. 10/195,830, filed on Jul. 12, 2002, now Pat. No. 6,669,218.

(51) Int. Cl.
*B62K 25/08* (2006.01)
(52) U.S. Cl. .................................. 280/279; 280/281.1
(58) Field of Classification Search .............. 280/281.1, 280/274, 279, 280
See application file for complete search history.

(56) References Cited

U.S. PATENT DOCUMENTS

| | | | |
|---|---|---|---|
| 1,559,277 A | 10/1925 | Nelson | |
| 2,236,127 A | 3/1941 | Alexander | |
| 2,307,279 A * | 1/1943 | Kranz | 280/276 |
| 3,936,076 A * | 2/1976 | Probst | 280/276 |
| 4,008,903 A | 2/1977 | Ramond | |
| 5,039,470 A | 8/1991 | Bezin et al. | |
| 5,318,819 A | 6/1994 | Pai | |
| 5,367,918 A | 11/1994 | Chang | |
| 5,445,366 A * | 8/1995 | Shih et al. | 267/140.13 |
| 5,511,811 A * | 4/1996 | Pileggi | 280/276 |
| 5,597,169 A * | 1/1997 | Bradbury | 280/276 |

(Continued)

FOREIGN PATENT DOCUMENTS

DE    201 06 106 U    6/2001

(Continued)

OTHER PUBLICATIONS

Martec Brochure (Martec Industrial Corporation); "Composite Bicycle Series".

*Primary Examiner*—Kevin Hurley
(74) *Attorney, Agent, or Firm*—Knobbe Martens Olson & Bear LLP

(57) ABSTRACT

A wheel support portion for a bicycle, such as a front fork assembly, arranged to reduce vibrations that originate at the bicycle wheel and are transmitted to the rider of the bicycle through the wheel support. Desirably, the front fork assembly is configured to be supported by a bicycle frame and includes a pair of fork legs, which extend in a downward direction along opposing sides of a front wheel of the bicycle. Preferably, the fork legs are configured to support the front wheel at their lower ends. Each of the fork legs defines a cavity and a damping member is positioned within the cavity. Also disclosed is a preferred method of manufacturing the wheel support.

10 Claims, 3 Drawing Sheets

U.S. PATENT DOCUMENTS

| | | | |
|---|---|---|---|
| 5,833,259 A * | 11/1998 | Stewart | 280/276 |
| 6,109,637 A | 8/2000 | Kirk | |
| 6,257,220 B1 | 7/2001 | McPherson et al. | |
| 6,267,399 B1 | 7/2001 | Buckmiller et al. | |
| 6,382,201 B1 | 5/2002 | McPherson et al. | |
| 6,431,574 B1 | 8/2002 | Gueugneaud | |
| 6,669,218 B1 | 12/2003 | Sinyard et al. | |
| 7,144,028 B2 | 12/2006 | Sinyard et al. | |
| 7,168,726 B2 * | 1/2007 | Klein | 280/284 |
| 7,175,191 B2 | 2/2007 | Sinyard et al. | |

FOREIGN PATENT DOCUMENTS

| | | |
|---|---|---|
| FR | 2774060 A1 * | 7/1999 |
| FR | 2 810 291 A | 12/2001 |
| JP | 8-53092 | 2/1996 |
| JP | 8053092 | 2/1996 |
| JP | 08113178 A * | 5/1996 |
| WO | WO 01/96173 A1 | 12/2001 |

* cited by examiner

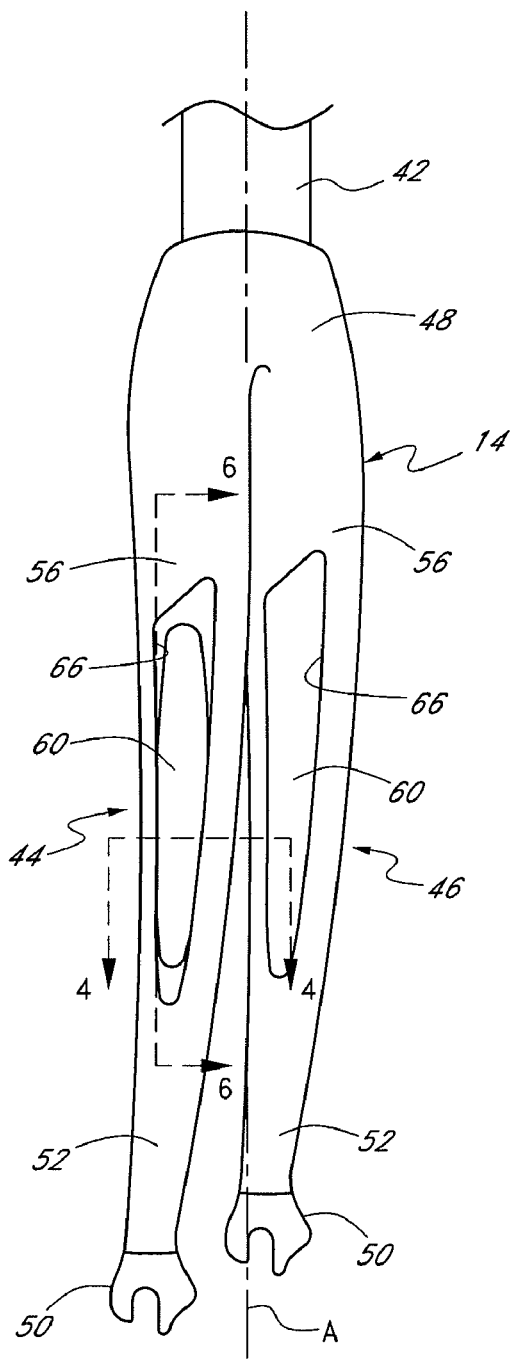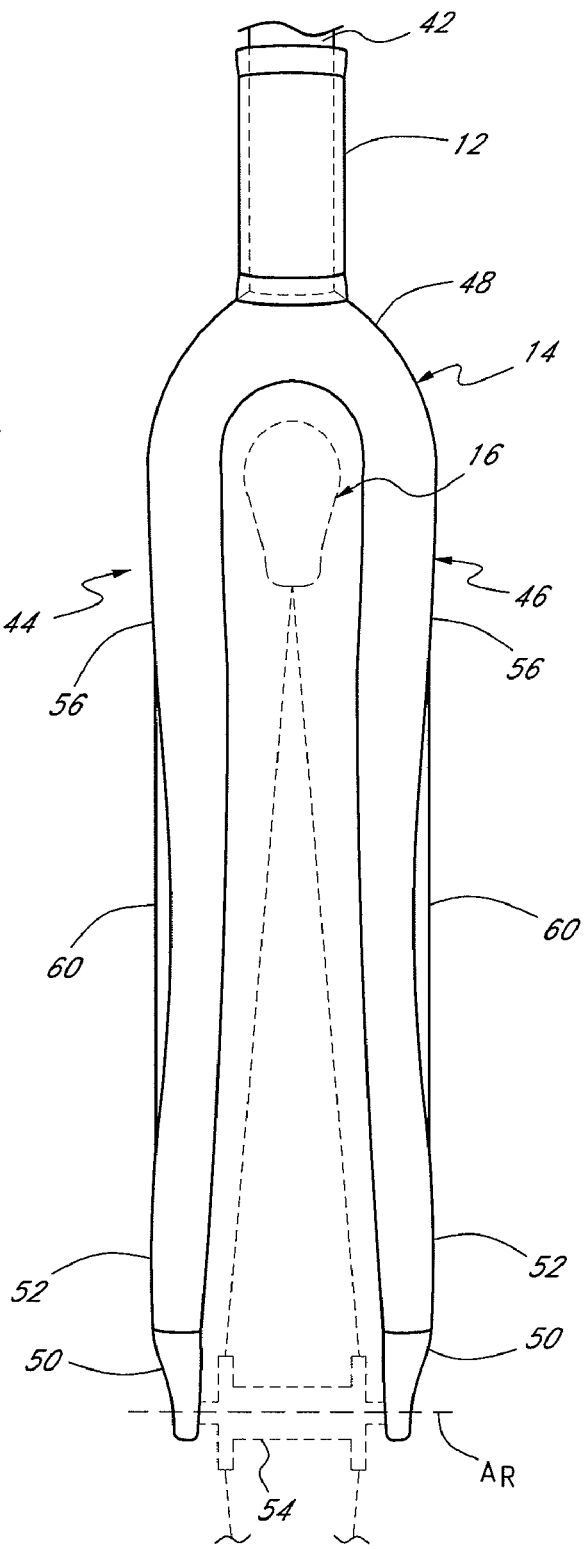
FIG.2
FIG.3

BICYCLE FRONT FORK ASSEMBLY

RELATED APPLICATIONS

This application is a continuation of U.S. patent application Ser. No. 11/417,996, filed May 3, 2006, now U.S. Pat. No. 7,175,191, which is a continuation of U.S. patent application Ser. No. 10/692,226, filed Oct. 23, 2003, now U.S. Pat. No. 7,144,028, which is a continuation of U.S. patent application Ser. No. 10/195,830, filed Jul. 12, 2002, now U.S. Pat. No. 6,669,218.

INCORPORATION BY REFERENCE

The entireties of U.S. patent application Ser. No. 11/417,996, filed May 3, 2006, U.S. patent application Ser. No. 10/692,226, filed Oct. 23, 2003, and U.S. patent application Ser. No. 10/195,830, filed Jul. 12, 2002, are hereby expressly incorporated by reference herein and made a part of the present disclosure.

BACKGROUND OF THE INVENTION

1. Field of the Invention

The present invention generally relates to bicycles. More particularly, the present invention relates to a bicycle front fork configured to reduce vibrations transmitted to a rider of the bicycle.

2. Description of the Related Art

Bicycle riding and racing often takes place on less than ideal terrain conditions. For example, bicycle touring and racing may often take place on country roads, which may be unpaved or where the pavement may be rough and irregular, even when new. In more populated areas, a significant portion of paved roads may be damaged and in need of repair. When traversed by the bicycle, these irregular surfaces transmit vibrations to the bicycle. Furthermore, the surface of even relatively new pavement, while acceptable for motor vehicles, may be rough enough to transmit significant vibration to a bicycle. Accordingly, most bicyclists spend at least a significant portion of their riding time traversing rough or irregular surfaces. Vibrations induced by such terrain, if not sufficiently dampened, may be transmitted to the rider of the bicycle. When transmitted to the rider, these vibrations often cause discomfort and fatigue.

Several methods for damping terrain-induced vibrations have been utilized. For example, the bicycle may be equipped with front and/or rear suspension assemblies, which permit the suspended wheel to move against a biasing force relative to the bicycle frame. Although highly favored in some applications, such as bicycles intended primarily for off-road use, such suspension assemblies have generally been unsuccessful in connection with bicycles primarily intended for use on paved surfaces (i.e., road bicycles), where low weight and aerodynamics are considered highly important. Furthermore, such suspension assemblies are intended to absorb large bumps and may not be effective at isolating vibrations due to inherent friction within the assembly, which may prevent movement of the suspension assembly in response to small forces.

In road bicycle applications, it has recently become popular to utilize materials having improved damping properties in comparison to metals to form a portion of the bicycle between the wheels and the rider. For example, a composite material of carbon fiber fabric within a resin matrix ("carbon fiber") is often used in an attempt to isolate road-induced vibrations from the rider of the bicycle. In some instances, the entire frame of the bicycle may be comprised of a carbon fiber material. However, due to the high manufacturing costs associated with molding carbon fiber, such bicycle frames are expensive to manufacture. Another common method is to produce the main frame of a more conventional material, such as steel, aluminum or titanium, and provide smaller component parts of carbon fiber material in an attempt to reduce vibration. For example, the front fork, seat post, handlebars, and stay portions of the frame (i.e., seat stays and/or chain stays) may be produced from a carbon fiber material.

Such an arrangement has been more successful in isolating terrain-induced vibrations from reaching the rider of the bicycle in comparison with bicycle frames and components comprised entirely of metal. However, although carbon fiber is lightweight and exhibits improved vibration damping characteristics in comparison to metal, a significant amount of vibration may nonetheless be transferred through components made from carbon fiber.

One proposed solution to carbon fibers undesirable transmission of vibrations is to incorporate an additional material into the carbon fiber fabric that is used to make the final carbon fiber product. For example, a weave of titanium filaments has been incorporated into carbon fiber fabric in an attempt to reduce the amount of vibration that is transmitted through components made of carbon fiber. However, such a solution necessitates a complex manufacturing process and, thus, increases the cost of the final product.

SUMMARY OF THE INVENTION

Accordingly, a need exists for a cost-effective method of reducing vibrations from being transmitted from the wheels of a bicycle to the rider of the bicycle. Preferred embodiments of the front fork assembly are constructed from a carbon fiber material and includes a cut-out portion on each leg of the fork assembly, which defines a cavity for receiving a separate vibration damping member. Preferably, the vibration damping member is constructed from an elastomeric material and is retained with a friction fit within the cavity of each leg of the front fork.

A preferred embodiment is a bicycle front fork assembly including a steer tube and a pair of fork legs extending in a downward direction from the steer tube and spaced from one another in a lateral direction. Each of the pair of legs has an upper portion, an intermediate portion and a lower portion and defines a substantially fixed length. The fork assembly is configured to support a wheel at the lower portions of the pair of legs and the pair of legs are interconnected at the upper portion. Each of the intermediate portions has an internal wall defining an internal cavity. A damping member is positioned within the cavity and contacts the internal wall. The damping member comprises a vibration damping material.

A preferred embodiment is a bicycle front fork assembly including a steer tube and a pair of hollow, tubular legs extending in a downward direction from the steer tube and spaced from one another in a lateral direction. Each of the pair of legs defines a substantially fixed length. The fork assembly is configured to support a wheel at a lower end of the pair of legs. Each of the pair of legs has an outer wall portion and an internal wall portion. The internal wall portion extends from a first side of the outer wall portion to a second side of the outer wall portion opposite the first side. The internal wall portion defines an internal cavity. A damping member positioned within the cavity and contacts the internal wall. The damping member comprising a vibration damping material.

A preferred embodiment is a bicycle including a frame, which supports a pedal crank assembly and a rear wheel. The pedal crank assembly is configured to drive the rear wheel. A front fork assembly is rotatably supported by the frame for pivotal movement about a steering axis. The fork assembly is configured to support a front wheel of the bicycle at a lower end of the fork. The fork assembly includes a steer tube and a pair of hollow, tubular legs. The pair of legs extend in a downward direction from the steer tube and are spaced from one another in a lateral direction and define a substantially fixed length. Each of the pair of legs has an outer wall portion and an internal wall portion. The internal wall portion extends from a first side of the outer wall portion to a second side of the outer wall portion opposite the first side. The internal wall portion defines an internal cavity. A damping member is positioned within the cavity and contacts the internal wall. The damping member comprises a vibration damping material.

A preferred embodiment is a bicycle including a main frame portion. A front wheel and a rear wheel are connected to the main frame portion. A pedal crank assembly supported by the main frame and being configured to drive the rear wheel. A wheel support portion is connected to the main frame at a first end and supports one of the front wheel and the rear wheel at a second end. The wheel support portion includes a pair of hollow, tubular legs extending along opposing sides of the one of the front wheel and the rear wheel. Each of the pair of legs has an outer wall portion and an internal wall portion and defines a substantially fixed length. The internal wall portion extends from a first side of the outer wall portion to a second side of the outer wall portion opposite the first side. The internal wall portion defines an internal cavity. A damping member is positioned within the cavity and contacts the internal wall. The damping member comprises a vibration damping material.

A preferred embodiment involves a wheel support for a bicycle including a body having a pair of legs. Each of the legs has a first end, a second end, and an intermediate portion extending between the first and second ends. The pair of legs are interconnected at the first ends and configured to support a bicycle wheel at the second ends. Each of the pair of legs define a substantially fixed length between the first and second ends. Each of the intermediate portions include an outer wall portion and an internal wall portion, which defines a cavity. A damping member is positioned within the cavity and contacts the internal wall. The damping member comprises a vibration damping material. The outer wall portion and the damping member each define a portion of an external surface of the wheel support.

A preferred embodiment involves a wheel support for a bicycle including a body having a first leg and a second leg each having a first end, a second end, and an intermediate portion extending between the first and second ends. The first and second legs are interconnected at the first ends and configured to support a bicycle wheel at the second ends. Each of the first and second legs define a substantially fixed length between the first and second ends. Each of the intermediate portions include an outer wall portion and an internal wall portion, which defines a cavity. A damping member is positioned within the cavity and contacts the internal wall. The damping member comprises a vibration damping material. Each of the cavities extend a distance along the fixed length of the first and second legs that is less than the fixed length.

A preferred embodiment involves a method of manufacturing a wheel support for a bicycle. The method includes constructing a body including a pair of legs interconnected at a first end and configured to support a bicycle wheel at a second end. Each of the pair of legs define a substantially fixed length between the first end and the second end. An intermediate portion extends between the first and second end and includes an outer wall portion and an internal wall portion, which defines a cavity. The method also includes inserting a damping member into the cavity, the damping member comprising a vibration damping material.

A preferred embodiment is a bicycle including a main frame portion, a wheel, and a substantially rigid wheel support. The wheel support is coupled to the main frame portion at a first end and supports the wheel at a second end. An outer wall of the wheel support defines an opening to a cavity. A damping member is positioned within the cavity and dampens vibrations introduced to the wheel support by the wheel.

BRIEF DESCRIPTION OF THE DRAWINGS

These and other features, aspects and advantages of the present invention are described with reference to drawings of a preferred embodiment, which is intended to illustrate, and not to limit, the present invention. The drawings comprise six figures.

FIG. 2 is a top, left side, and rear perspective view of the front fork assembly of FIG. 1.

FIG. 3 is a front view of a portion of the bicycle and front fork assembly of FIG. 1.

DETAILED DESCRIPTION OF THE PREFERRED EMBODIMENTS

Figure 1:
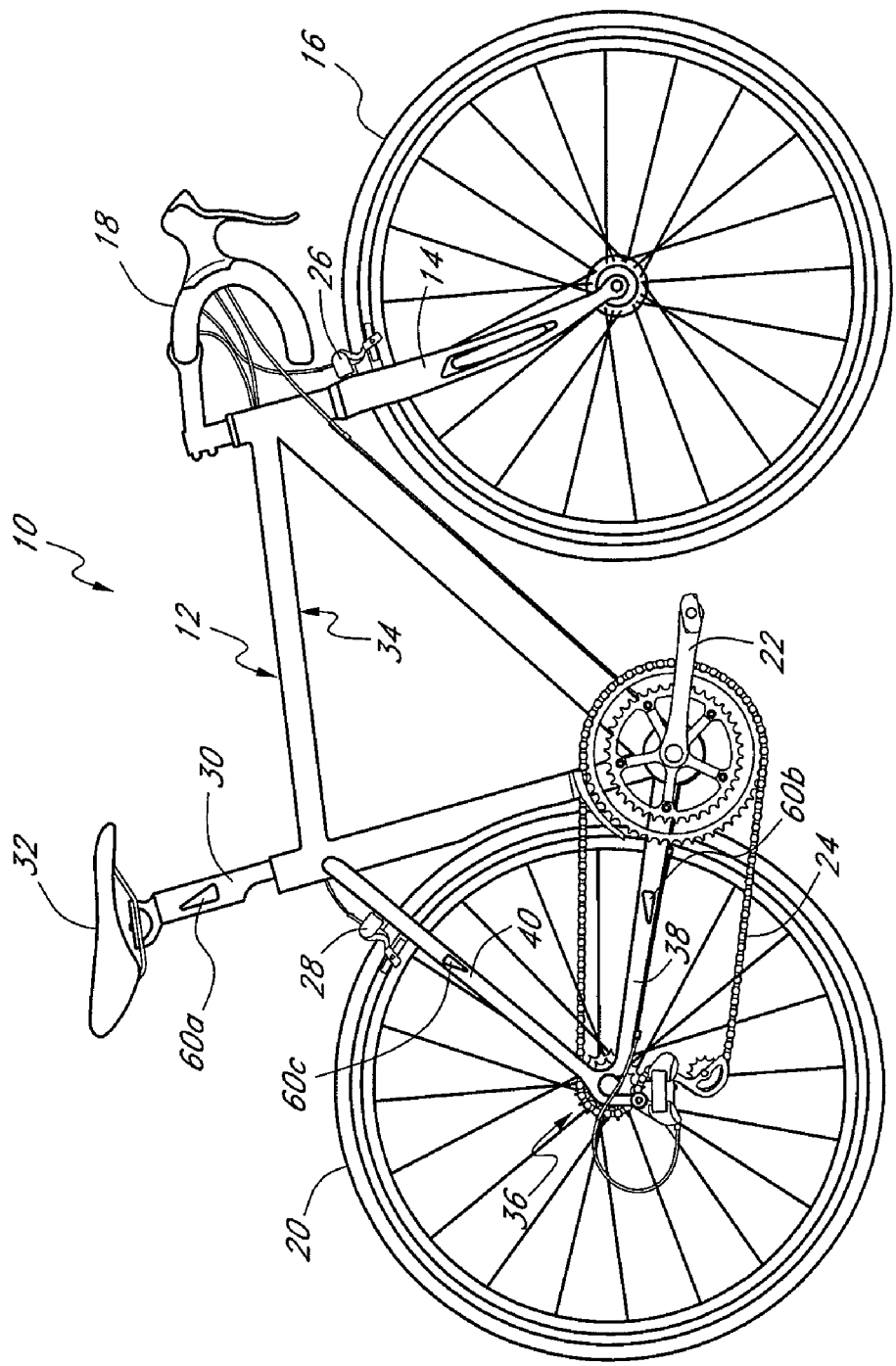
FIG. 1 is a side elevational view of a bicycle incorporating a preferred front fork assembly.

FIG. 1 illustrates a bicycle, which is referred to generally by the reference numeral 10. The bicycle 10 includes a frame 12, which rotatably supports a wheel support, or front fork assembly 14, near a forward end of the frame 12 for rotation about a steering axis. A lower end of the fork assembly 14 supports a front wheel 16 of the bicycle 10. A handlebar assembly 18 is connected to an upper end of the fork 14 for rotating the fork assembly 14 and front wheel 16 about the steering axis of the bicycle 10. In addition, the handlebar assembly 18 may include one or more rider controls, such as shifting or braking controls.

A rear wheel 20 of the bicycle 10 is supported near a rearward end of the frame 12. A pedal crank assembly 22 is rotatably supported by a lower portion of the frame 12. A drive chain 24 extends between the pedal crank assembly and the rear wheel to transfer power therebetween, as is well known in the art.

A front brake caliper 26 is supported by the front fork assembly 14 and is configured to selectively apply a squeezing force to a rim of the front wheel 16. Similarly, a rear brake caliper 28 is supported by the frame 12 and configured to selectively apply a squeezing force to a rim portion of the rear wheel 20. Alternatively, other types of braking systems may also be used.

A seat post 30 extends in an upward direction from the frame 12 and supports a seat 32 on its upper end. The seat post 30 may be adjusted in height relative to the frame 12 to adjust a seat height of the bicycle 10.

Preferably, the frame 12 includes a main frame portion 34 and a wheel support, or rear frame portion 36. The rear frame portion 36 desirably includes a pair of lower legs, or chain stay members 38 (only one shown), extending on each side of the rear wheel 20 from a lower portion of the main frame 34. In addition, the rear frame portion 36 includes a pair of upper legs, or seat stay members 40, extending from an upper portion of the main frame 34 on each side of the rear wheel 20 and being connected to a rear end of the chain stays 38 near a hub axis of the rear wheel 20.

Desirably, at least the main frame 34 is constructed from a plurality of tubular, metal pieces welded together. For example, the main frame 34 may be constructed from aluminum, steel or titanium tubing. Alternatively, the frame may comprise a composite material and may be constructed as a unitary piece. In addition, other suitable materials and/or construction methods may also be used, as will be appreciated by one of skill in the art.

As described above, the front fork assembly 14 preferably is constructed to reduce the amount of vibration passed from the front wheel 16 to the handlebar assembly 18, and thus the rider of the bicycle 10. Additionally, other components of the bicycle 10 may also be constructed to reduce vibration transfer. For example, the seat post 30 may be constructed to include a damping member 60a (FIG. 1) in a manner similar to the present fork assembly 14 to reduce the transmission of vibrations from the frame 12 to the seat 32 and, thus, the rider of the bicycle 10. Such a seat post 30 is described in greater detail in an application assigned to the assignee of the present application and entitled BICYCLE SEAT POST ASSEMBLY (U.S. patent application Ser. No. 10/195,831, filed Jul. 12, 2002, Publication No. US 2004/0084872 A1), which is hereby incorporated by reference in its entirety and made a part of this application. Furthermore, other components and/or portions of the bicycle 10, such as the chain stays 38 or seat stays 40 of the frame 12, may be similarly arranged to include a damping member 60b, 60c, respectively, to reduce the transmission of vibrations from the wheels 16, 20 to the rider of the bicycle 10, as will be appreciated by one of skill in the art in light of the teachings of the present application.

With reference to FIGS. 2 and 3, a preferred front fork 14 is illustrated in greater detail. In FIG. 2, the front wheel 16 has been omitted and in FIG. 3, the front wheel 16 is shown in phantom for the purpose of clarity. As is described in greater detail below, preferably, the fork 14 is constructed as a composite of a plurality of sheets of a carbon fiber material within an epoxy resin matrix and incorporates a vibration damping member comprised of an elastomeric material. Preferably the damping member comprises a thermoplastic elastomer, and more preferably a viscoelastomeric material, as is described in greater detail below.

A steer tube 42 of the front fork assembly 14 extends through the frame 12 of the bicycle 10 and supports the handlebar assembly 18 (FIG. 1) at its upper end. A pair of fork legs 44, 46 extend downward from the steer tube 42 on opposing sides of the front wheel 16. The fork legs 44, 46 are interconnected at an upper end 48, which is also connected to the steer tube 42. An intermediate portion 56 of the fork legs 44, 46 connects the upper portion 48 to the lower portion 52. Thus, each fork leg 44, 46 is a generally rigid member that defines a substantially constant length. That is, preferably, the fork assembly 14 is constructed such that relative movement between the front wheel 16 and the bicycle frame 12 is substantially prevented. Such a construction is commonly referred to as an unsuspended, or rigid, fork assembly. Furthermore, desirably, the fork legs 44, 46 and the steer tube 42 are of a one-piece construction.

A drop out 50 is secured to a lower end 52 of each fork leg 44, 46. The drop outs 50 are sized and shaped to receive an axle portion of a hub 54 of the front wheel 16. Desirably, the drop outs 50 are constructed of a metal, such as aluminum or steel, and are secured to the fork legs 44, 46 by a bonding process. However, other suitable arrangements to connect the front wheel 16 to the fork assembly 14 may also be used.

With reference to FIGS. 1 and 2, desirably, the fork legs 44, 46 are arranged such that the hub 54 is supported on a forward side of an axis A defined by the steer tube 42. This is commonly referred to as the "rake" of the fork 14. Such an arrangement provides more stability to the handling characteristics of the bicycle 10, as is well known in the art.

In the illustrated embodiment, the upper portion 48 of the fork legs 44, 46 are substantially aligned with the axis A of the steer tube 42. The intermediate portions 56 of the fork legs 44, 46 curve in a forward direction in the such that the lower ends 52 and drop outs 50 are positioned forward of the axis of the bicycle 10. However, in other arrangements, the fork legs 44, 46 may be substantially straight and meet the steer tube 42 at an angle such that the hub 54 of the front wheel 16 is positioned forward of the axis A.

With reference to FIG. 3, the intermediate portions 56 of the fork legs 44, 46 are each curved inwardly in a lateral direction (i.e., toward one another) such that a distance therebetween is narrower than a distance between the upper portions 48 of the fork legs 44, 46. The lower ends 52 of the fork 14 extend in an outward direction (i.e., away from one another) such that the distance therebetween is greater than the distance between the intermediate portions 56. Such an arrangement defines a generally hourglass-shaped space between the fork legs 44 and 46, which conforms to the cross-sectional shape of the front wheel 16 to improve the aerodynamics and vertical compliance of the fork assembly 14.

As described above, each of the fork legs 44, 46 desirably define a cavity in which a damping member 60 is positioned. Preferably, the damping member 60 is located within the intermediate portion 56 of each fork leg 44, 46 and, preferably, within the curve of the intermediate portion 56. Desirably, the damping member is substantially triangular in shape in a side elevational view. Such an arrangement advantageously maximizes the contact area between the damping member 60 and the fork leg 44, 46 within the space available, which enhances vibration damping, while preserving the strength and stiffness of the fork 14, which improves handling.

Furthermore, desirably the damping member 60 is substantially solid and, preferably, is completely solid. Such an arrangement advantageously provides consistent, uniform vibration damping performance of the damping member 60. In addition, desirably, the cross-sectional area of the damping member 60 is great enough to effectively dampen vibrations from reaching the rider of the bicycle 10. In the context of a bicycle front fork assembly 14, preferably the cross-sectional area of the largest portion of the damping member 60 is about 60 mm$^2$ and, more preferably, about 120 mm$^2$. However, other cross-sectional dimensions may be desirable to provide a different level of vibration damping or for other applications.

Figure 5:
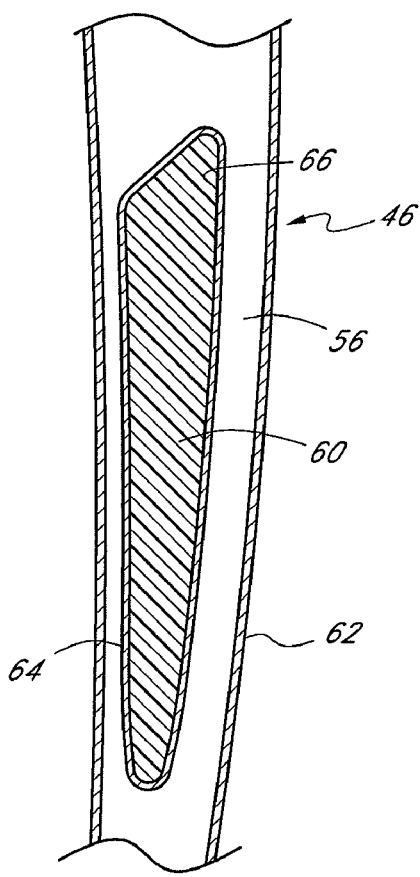
FIG. 5 is a partial cross-section of the left leg of the front fork assembly of FIG. 1 taken along line 5-5 of FIG. 4.
Figure 6:
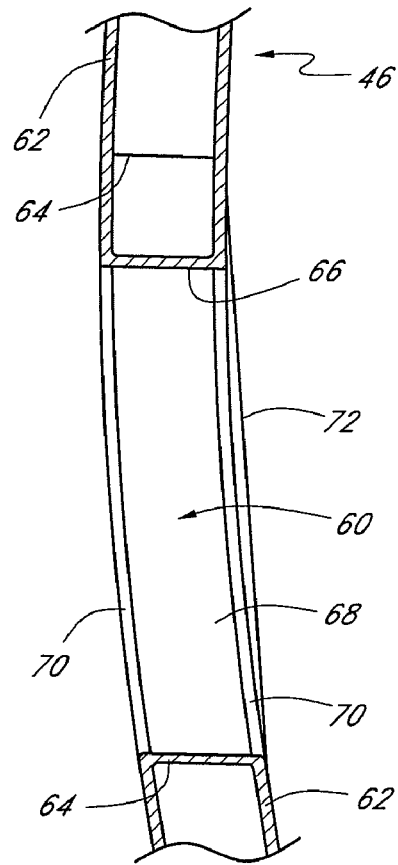
FIG. 6 is a partial sectional view of the left leg of the front fork assembly of FIG. 1 taken along line 6-6 of FIG. 2.
Figure 4:
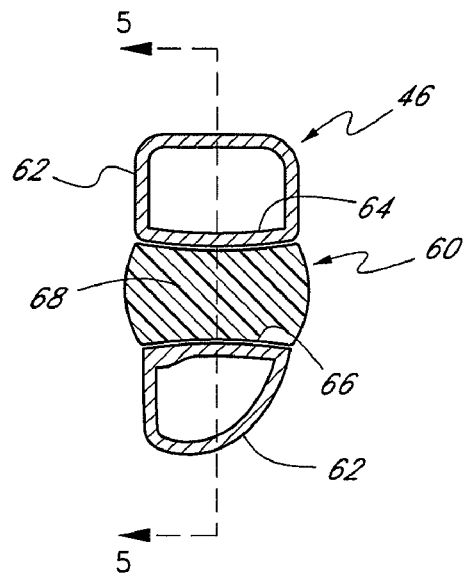
FIG. 4 is a cross-section view of the left leg portion of the front fork assembly of FIG. 1 taken along line 4-4 of FIG. 2.

With reference to FIGS. 4-6, the left fork leg 46 is shown in several sectional views. The sectional views, and associated description of the fork leg 46, are described with reference to a coordinate system wherein a vertical, longitudinal plane extends along the length of the bicycle 10 and is substantially aligned with a plane defined by the frame 12 and wheels 16, 20. A vertical, lateral plane is substantially normal to the longitudinal plane and a horizontal plane is substantially normal to both the longitudinal and lateral planes.

FIG. 4 is a cross-sectional view of the fork leg 46 taken along a horizontal plane and intersecting the damping member 60. FIG. 5 is a partial cross-sectional view of the fork leg 46 taken along a vertical, longitudinal plane and intersecting the damping member 60. FIG. 6 is a partial cross-sectional view of the fork leg 46 taken along a vertical, lateral plane and aligned with a front surface of the damping member 60.

As illustrated, desirably, the fork leg 46 is of a thin wall, hollow construction to reduce weight. Preferably, the fork leg 46 is comprised of an outer wall portion 62, which defines an outer surface of the fork leg 46 and an internal wall portion 64, which defines a cavity 66, for receiving the damping member 60. Thus, the outer wall portion 62 defines front, rear, left-side and right-side wall portions of the fork leg 46.

Desirably, the outer and internal wall portions 62, 64 are continuous with one another. As described above, desirably, the cavity 66 is substantially triangular in shape and passes completely through the fork leg 46 in a lateral direction. Accordingly, the internal wall portion 64 is substantially parallel to an axis of rotation AR of the front wheel 16 (FIG. 3). Such an arrangement permits the fork leg 46 to maintain strength in a longitudinal direction (i.e., the direction in which loads are primarily imparted on the wheel 16), while incorporating the damping member 60. However, in other arrangements, the cavity 66 may pass only partially through the fork leg 46 and may be fully or partially closed on one, or both, sides.

With reference to FIG. 4, a central portion 68 of the damping member 60 has a reduced thickness in a longitudinal direction such that a forward and rearward surface of the central portion 68 conforms with the curved forward and rearward portions of the wall 64 of the fork leg 46, which defines the cavity 66. That is, preferably, a width of the cavity 66 is reduced in a central portion thereof. Such an arrangement assists in retaining the damping member 60 within the cavity 66 and allows substantially complete contact between the wall 64 and the outer perimeter of the damping member 60. Desirably, the cross-section of the damping member 60 is substantially consistent throughout its length. That is, the reduced thickness of the central portion 68 preferably extends substantially the entire length of the damping member 60. Such an arrangement advantageously assists in retaining the damping member 60 within the cavity 66 due to the outer portions of the damping member 60 being larger than the central portion of the cavity 60.

With reference to FIGS. 5 and 6, desirably, the damping member 60 is curved along its length to conform with both the forward and lateral curve of the fork leg 46, as described above. However, with reference to FIG. 6, an outer surface 72 of the damping member 60 (i.e., the surface opposite the wheel 16 in FIG. 3) is substantially linear in a vertical direction. Such an arrangement enhances visibility of the damping member 60.

Although not shown in detail, desirably, the right fork leg 44 is substantially a mirror image of the left fork leg 46. However, as will be readily appreciated by one of skill in the art, in other aspects the damping member 60 of the right fork leg 44 is substantially identical to that described above.

When constructed substantially as described above, the preferred fork assembly 14 inhibits vibrations from passing through the fork legs 44, 46. Thus, vibrations originating at the lower end 52 of the fork legs 44, 46 (i.e., at the front wheel 16) are inhibited from passing to the upper ends 48 and steer tube 42 of the fork 14 and, thus, the handlebar 18 of the bicycle 10. Such an arrangement improves the comfort of the rider and reduces fatigue during long rides.

Preferably, the entire fork assembly 14, with the exception of the damping members 60, is constructed in a manner conventional for composite bicycle forks. However, the fork assembly 14 may be constructed by any other suitable method. Desirably, the damping members 60 are sized slightly larger than the cavities 66 and are retained within the cavities 66 by contact friction therebetween. Preferably, the damping members 60 are sized such that they may be assembled into the fork 14 by hand. However, the damping members 60 may also be press fit into the cavities 66 using the assistance of a machine, such as a press, for instance.

Although the above-described process is preferred, the damping members 60 may be secured within the cavities 66 by other means as well. For example, an adhesive may be used to create a chemical bond between the contact surfaces of the damping member 60 and the wall 64 defining the cavity 66. In other arrangements, the damping member 60 may be assembled during manufacturing of the fork assembly 14, such as by co-molding, for example.

Of course, the foregoing description is that of certain features, aspects and advantages of the present invention to which various changes and modifications may be made without departing from the spirit and scope of the present invention. Moreover, a front fork assembly may not feature all objects and advantages discussed above in order to use certain features, aspects and advantages of the present invention. Thus, for example, those skilled in the art will recognize that the invention may be embodied or carried out in a manner that achieves or optimizes one advantage or a group of advantages as taught herein without necessarily achieving other objects or advantages as may be taught or suggested herein. The present invention, therefore, should only be defined by the appended claims.

What is claimed is:

1. A bicycle, comprising:
   a main frame portion;
   a wheel;
   a substantially rigid wheel support coupled to said main frame portion at a first end and supporting said wheel at a second end, said wheel support having a substantially fixed length such that said wheel is supported at a substantially fixed distance from said main frame, an outer wall of said wheel support defining an opening to a cavity; and
   a damping member positioned within said cavity, wherein said damping member dampens vibrations introduced to said wheel support by said wheel.

2. The bicycle of claim 1, wherein said wheel is a front wheel of said bicycle and said wheel support is a front fork.

3. The bicycle of claim 1, wherein said damping member is a solid piece of a elastomeric material.

4. A bicycle, comprising:
   a main frame portion;
   a wheel;
   a substantially rigid wheel support coupled to said main frame portion at a first end and supporting said wheel at a second end, an outer wall of said wheel support defining an opening to a cavity; and
   a damping member positioned within said cavity, wherein said damping member dampens vibrations introduced to said wheel support by said wheel;
   wherein said damping member is a solid piece of a elastomeric material and occupies substantially the entire volume of the cavity.

5. A bicycle, comprising:
   a main frame portion;
   a wheel;

a substantially rigid wheel support coupled to said main frame portion at a first end and supporting said wheel at a second end, an outer wall of said wheel support defining an opening to a cavity; and a damping member positioned within said cavity, wherein said damping member dampens vibrations introduced to said wheel support by said wheel;

wherein said cavity extends through said wheel support in a direction substantially parallel to an axis of rotation of said wheel.

6. The bicycle of claim 5, wherein said cavity extends entirely through said wheel support.

7. The bicycle of claim 1, wherein said wheel support comprises an internal wall that defines said cavity.

8. The bicycle of claim 7, wherein said internal wall is formed continuously with said outer wall.

9. A bicycle, comprising:

a main frame portion;

a wheel;

a substantially rigid wheel support coupled to said main frame portion at a first end and supporting said wheel at a second end, an outer wall of said wheel support defining an opening to a cavity; and a damping member positioned within said cavity, wherein said damping member dampens vibrations introduced to said wheel support by said wheel;

wherein said cavity is generally triangular in shape from a side view of said bicycle.

10. The bicycle of claim 1, wherein said cavity is located in an intermediate portion of said wheel support between said first and second ends.

* * * * *